Aug. 21, 1962    R. C. MILLER ETAL    3,050,662
PROXIMITY SWITCH
Filed July 7, 1958
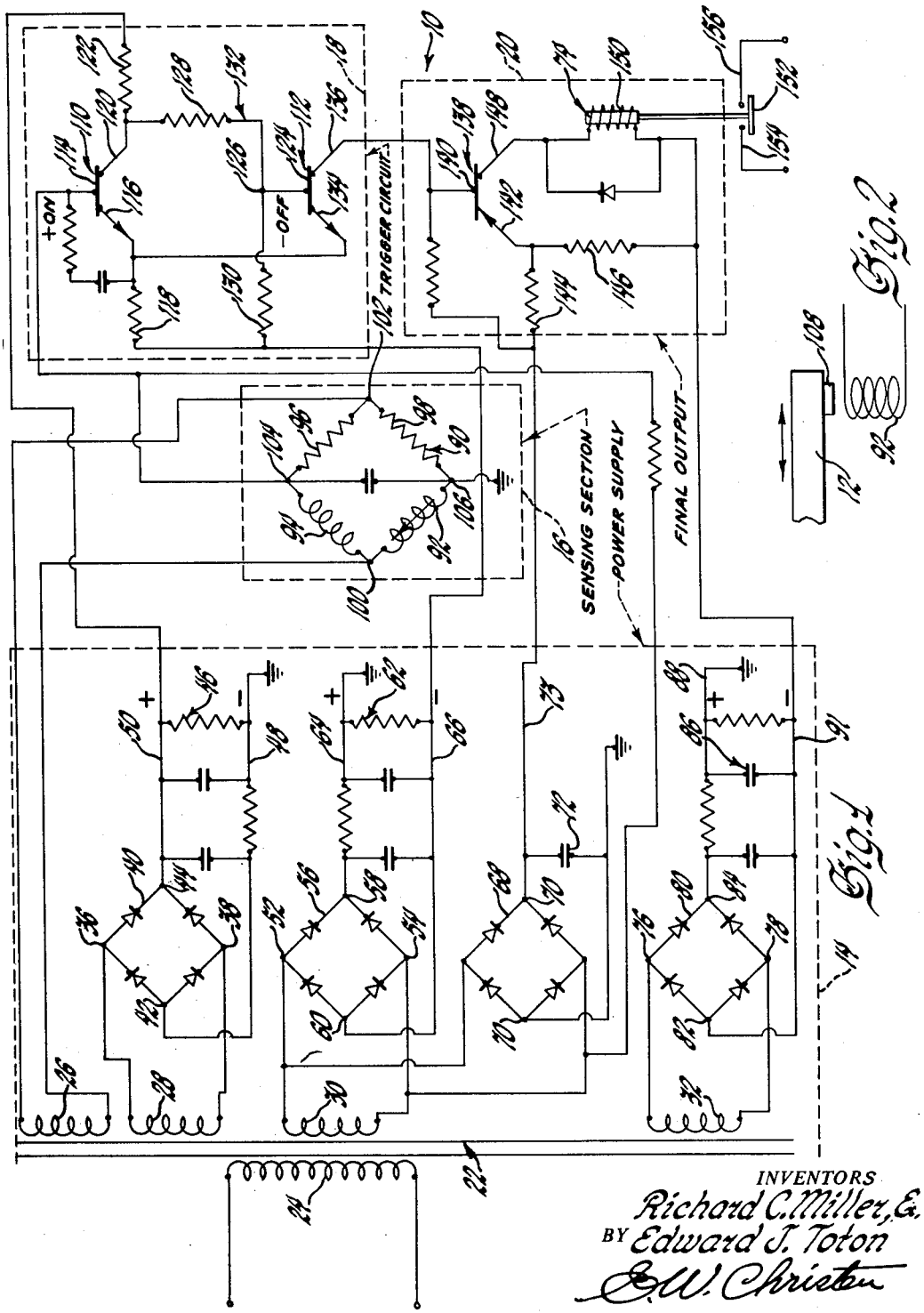
INVENTORS
Richard C. Miller, &
BY Edward J. Toton
S.W. Christen
ATTORNEY United States Patent Office 3,050,662
Patented Aug. 21, 1962

3,050,662
PROXIMITY SWITCH
Richard C. Miller, Detroit, and Edward J. Toton, Birmingham, Mich., assignors to General Motors Corporation, Detroit, Mich., a corporation of Delaware
Filed July 7, 1958, Ser. No. 746,897
4 Claims. (Cl. 317—148.5)

The present invention relates to a proximity switch particularly adapted for use in a device such as a machine tool for limiting the amount of travel of an oscillating member.

In machine tools and other installations it is desirable to provide means for limiting the amount of travel of a reciprocating member. One means for accomplishing this is to provide a reversible drive for the reciprocating member and means for reversing the drive whenever the member reaches a desired extremity of its travel. Heretofore, it has been customary in controlling the drive to provide a mechanical limit switch which is physically engaged so as to close a pair of electrical contacts. Although such arrangements provide acceptable results in machine tool and other applications, the mechanical switch is normally required to be located in an oily and abrasive atmosphere. Such an environment is detrimental to proper operation of such a switch and not only causes frequent malfunctioning but also results in premature failures from burned contacts, broken and worn parts, etc.

It is now proposed to provide means for limiting the amount of reciprocating travel of a reciprocating member which will not be adversely effected by the presence of oil and/or abrasive substances. More particularly, this is to be accomplished by providing a proximity switch which is adapted to sense without any form of physical contact therewith the position of the reciprocating member when it is located at the end of its travel. In the present arrangement a piece of magnetic material is provided on the reciprocating member and an inductive pick-up coil is positioned so that at its extreme position the piece of magnetic material will be adjacent the coil and will change the inductance thereof. This change in inductance is effective to actuate a transistorized trigger circuit which in turn causes reversal of the movement of the reciprocating member. It may thus be seen that there will be no mechanical contact between any relatively moving parts.

In the one sheet of drawings:

FIGURE 1 is a wiring diagram of an apparatus embodying the present invention.

FIGURE 2 is a fragmentary view of a reciprocating member and a pickup therefor.

Referring to the drawings in more detail, the present invention is adapted to be employed in a proximity switch apparatus 10 for use in limiting the amount of travel of a reciprocating member 12 such as may be employed in a machine tool. The switch apparatus 10 includes a power source 14, a sensing section 16, a trigger circuit 18 and a final output 20.

The power section 14 comprises a transformer 22 having a primary winding 24 adapted to be connected with a suitable source of alternating power. In addition, the transformer 22 includes an alternating source secondary 26, a pair of step-down low voltage secondaries 28 and 30 and an intermediate voltage secondary 32. The first secondary 26 provides a source of A.C. potential having voltage suitable for use in the sensing section 16.

The first step-down secondary 28 is interconnected with diagonally opposite corners 36 and 38 of a bridge rectifier circuit 40. The conjugate corners 42 and 44 of the bridge 40 are interconnected with a filter circuit 46 having the negative side 48 thereof grounded so that the other side 50 will form a low voltage positive source of D.C. potential.

The second step-down secondary 30 is also interconnected with the opposite corners 52 and 54 of a second bridge rectifier circuit 56. The conjugate corners 58 and 60 of this rectifier circuit 56 are interconnected with a second filter circuit 62 having the positive side 64 thereof grounded so that the opposite side 66 will form a low voltage negative source of D.C. potential. In addition, a supplementary bridge rectifier circuit 68 may be connected across the secondary 30. The conjugate corners 70 of this bridge 68 are connected to a filtering condenser 72 so as to form a second source 73 of positive D.C. potential.

The intermediate secondary 32 reduces the voltage to a level suitable for use with a power relay 74 in the final output 20. This secondary 32 is connected across the opposite corners 76 and 78 of an additional bridge rectifier 80. The conjugate corners 82 and 84 of the bridge 80 are in turn connected to a filter circuit 86 having the positive side 88 thereof grounded so that the opposite side 91 will form an intermediate negative voltage source.

The sensing section 16 includes a normally balanced bridge 90 two sides of which comprise a pair of inductances 92 and 94 and two sides of which comprise a pair of resistors 96 and 98. The opposite corners 100 and 102 of the bridge 90 formed by the junction between the two inductances 92 and 94 and the junction between the two resistances 96 and 98 are interconnected with the opposite ends of the alternating secondary 26. As a result the bridge 90 will have an alternating current flowing therein. However, the bridge 90 is normally balanced and there will be no output between the conjugate corners 104 and 106.

One of the inductances 92 in the bridge 90 forms a pickup that is so positioned that a piece 108 of magnetic material on the reciprocating member 12 will be disposed adjacent the coil 92 when the member is at the desired end of its travel. When this relationship exists the inductance of the pickup coil 92 will change and the bridge 90 will become unbalanced and an alternating signal will appear across the conjugate corners 104 and 106.

The trigger circuit 18 comprises a pair of transistors 110 and 112 arranged to form a Schmitt trigger circuit. The base 114 of the first transistor 110 is interconnected with one of the conjugate corners 104 of the bridge circuit 90 in the sensing section 16 so as to be responsive to alternating signals therefrom. The emitter 116 is interconnected with the negative D.C. source 66 by means of a bias resistor 118 while the collector 120 is interconnected with the positive D.C. source 50 by means of a load resistor 122.

The base 124 of the second transistor 112 is interconnected with the junction 126 between the resistors 128 and 130 of a voltage dividing network 132 extending from the collector 120 to negative source 66. The emitter 134 is interconnected directly with the emitter 116 of the first transistor 110. The second collector 136 forms the output from the trigger circuit 18.

Normally, the first transistor 110 will be free of any signals from the sensing section 16 and will have a sufficient positive potential on the base 114 thereof to insure its being conductive. However, it has been found desirable to obtain a shut-off signal from one side of the secondary 30 to insure a predetermined minimum potential. The current flow will cause a drop across the load resistor 122 that will reduce the voltage across the voltage dividing network 132. As a result the second transistor 112 will normally be biased so as to be non-conductive. As a result, the collector 136 or output of the trigger circuit will not have any signal thereon.

However, when the piece 108 of magnetic material changes the inductance of the coil 92 and unbalances the bridge 90, the first transistor 110 will have a signal on the base 114 thereof which will cause the transistor 110 to become non-conductive. The resultant decrease in current flow through the load resistor 122 will cause an increase in the potential across the voltage dividing network 132. This will in turn increase the potential on the base 124 of the second transistor 112. Thus the second transistor 112 will no longer be biased beyond cut off and will become conductive. The collector 136 will then have an A.C. square wave output having a frequency equal to that in the secondary 26. Consequently, the trigger circuit 18 will produce an output signal only when the bridge circuit 90 remains unbalanced.

The final output 20 includes a transistor 138 having the base 140 thereof connected to the collector 136 or trigger circuit output. The emitter 142 is connected to a resistor 144 leading to the low voltage D.C. source 73 and a resistor 146 leading to the intermediate voltage source 91. The collector 148 is connected to the coil 150 of a relay 74 effective to actuate a switch 152 movable between a pair of contacts 154 and 156 effective to control the direction of the drive means for moving the reciprocating member 12.

It will thus be seen that a proximity switch has been provided which may be employed for sensing the presence of a member in a particular location and is effective to actuate any desired type of control. This switch involves no physical contact between the moving member and the pickup coil. As a consequence, there will be no wearing thereof even though an excessive amount of abrasive material may be present in and around these parts. In addition, since there is no opening and closing of any switch contacts, there will be no burning of such contacts as a result of oil or dirt being present.

What is claimed is:

1. In a device for detecting the presence of a metallic object, a bridge circuit having an inductance coil in one arm thereof, said inductance coil having an impedance value that is changed appreciably when said object is brought in close proximity thereto whereby said bridge becomes unbalanced, a source of alternating voltage connected to opposite terminals of said bridge circuit, a trigger circuit having an input and an output, conductive means for connecting said input across the remaining terminals of said bridge circuit whereby a portion of said alternating voltage appears at said input only when said bridge becomes unbalanced, said trigger circuit adapted to produce a first signal at said output during each cycle of said alternating voltage when said portion of said alternating voltage exceeds a predetermined value and to produce a second signal at said output during each cycle of said alternating voltage when said portion of said alternating voltage is less than said predetermined value, switching means connected to said output to receive said first and second signals, a series circuit comprising a direct current supply source, an electrical utilization means, and said switching means, said switching means adapted to close said series circuit during each cycle of said alternating voltage when said first signal exists at said output and to open said series circuit during each cycle of said alternating voltage when said second signal exists at said output, said electrical utilization means being responsive to the average current flowing in said series circuit.

2. In a device for detecting the presence of a metallic object, a bridge circuit having an inductance coil in one arm thereof, said inductance coil having an impedance value that is changed appreciably when said object is brought in close proximity thereto whereby said bridge becomes unbalanced, a source of alternating voltage connected to opposite terminals of said bridge circuit, a trigger circuit having an input and an output, conductive means for connecting said input across the remaining terminals of said bridge circuit whereby a portion of said alternating voltage appears at said input when said bridge becomes unbalanced, said trigger circuit adapted to produce a first signal at said output during each cycle of said alternating voltage when said portion of said alternating voltage exceeds a predetermined value and to produce a second signal at said output when said portion of said alternating voltage is less than said predetermined value, switching means connected to said output to receive said first and second signals, a series circuit comprising a direct current supply source, a relay coil, and said switching means, said switching means adapted to close said series circuit during each cycle of said alternating voltage when said first signal exists at said output and to open said series circuit during each cycle of said alternating voltage when said second signal exists at said output, and relay contacts actuated by said relay coil and adapted to be closed when the average current flowing in said series circuit exceeds a predetermined value occurring when said metallic object is brought in close proximity to said inductance coil.

3. In a device for detecting the presence of a metallic object, an inductance coil, a bridge circuit having said inductance coil in one of its arms, a source of alternating voltage connected across opposite terminals of said bridge circuit whereby said inductance coil is energized such that its impedance is subject to an appreciable change when said metallic object is brought in close proximity to said inductance coil, a trigger circuit having an input and an output, conductive means for connecting said input to the remaining terminals of said bridge circuit whereby a portion of said alternating voltage will appear at said input when said bridge is unbalanced, said trigger circuit adapted to produce a first signal at said output when the potential present at said input is less than a predetermined value and to produce a second signal when the potential is greater than a predetermined value such that said portion of said alternating voltage will produce alternately said first and second signals, a transistor having a base, an emitter, and a collector, a series circuit including a source of direct current supply, electrical utilization means, and said emitter and collector of said transistor such that current will flow through said utilization means when conduction is allowed between said emitter and collector, and conductive means connecting said base to said output whereby said transistor is driven alternately conductive and non-conductive during each cycle of said alternating voltage in accordance with said first and second signals, said utilization means being responsive to the average current flowing in said series circuit.

4. In a device for detecting the presence of a metallic object, an inductance coil, a bridge circuit having said inductance coil in one of its arms, a source of alternating voltage connected across opposite terminals of said bridge circuit whereby said inductance coil is energized such that its impedance is subject to an appreciable change when said metallic object is brought in close proximity to said inductance coil, a trigger circuit having an input and an output, conductive means for connecting said input to the remaining terminals of said bridge circuit whereby a portion of said alternating voltage will appear at said input when said bridge is unbalanced, said trigger circuit adapted to produce a first signal at said output when the potential present at said input is less than a predetermined value and to produce a second signal when the potential is greater than a predetermined value such that said portion of said alternating voltage will produce alternately said first and second signals, a transistor having a base, an emitter, and a collector, a series circuit including a source of electrical supply, a relay coil, and said emitter and collector of said transistor such that current will flow through said relay coil when conduction is allowed between said emitter and collector, conductive means for connecting said base to said output whereby said transistor is driven alternately conductive and nonconductive during each cycle of said alternating voltage in accordance with said first and second signals, and relay contacts operated by said relay coil and adapted to be closed when the average current flowing in said series circuit is greater than a predetermined value occurring when said metallic object is brought in close proximity to said inductance coil.

References Cited in the file of this patent

UNITED STATES PATENTS

| | | |
|---|---|---|
| 2,113,737 | McMaster | Apr. 12, 1938 |
| 2,346,589 | Lamb | Apr. 11, 1944 |
| 2,648,040 | Schmeider | Aug. 4, 1953 |
| 2,768,347 | Hansen | Oct. 23, 1956 |
| 2,806,181 | Rockafellow | Sept. 10, 1957 |
| 2,889,496 | Moore | June 2, 1959 |
| 2,907,931 | Moore | Oct. 6, 1959 |